United States Patent
Fielding et al.

(10) Patent No.: US 6,663,243 B2
(45) Date of Patent: Dec. 16, 2003

(54) PROJECTION DEVICE COMPRISING A PRISM SYSTEM INCLUDING AT LEAST ONE TOTALLY INTERNALLY REFLECTING SURFACE AT A BOUNDARY BETWEEN TWO MEMBERS OF DIFFERENT REFRACTIVE INDICES WITHIN THE PRISM SYSTEM

(75) Inventors: Raymond Gordon Fielding, Oldham (GB); Martin Kavanagh, Oldham (GB); Graham Harry Moss, Chadderton (GB)

(73) Assignee: Texas Instruments Incorporated, Dallas, TX (US)

(*) Notice: Subject to any disclaimer, the term of this patent is extended or adjusted under 35 U.S.C. 154(b) by 25 days.

(21) Appl. No.: 09/859,751

(22) Filed: May 17, 2001

(65) Prior Publication Data

US 2001/0024268 A1 Sep. 27, 2001

Related U.S. Application Data

(63) Continuation of application No. 08/930,084, filed on Feb. 5, 1998, now Pat. No. 6,250,763.

(30) Foreign Application Priority Data

| May 11, 1995 | (GB) | 9509526 |
| May 12, 1995 | (GB) | 9509613 |
| May 10, 1996 | (WO) | PCT/GB96/01119 |

(51) Int. Cl.[7] ............................. G03B 21/00; G02F 1/00

(52) U.S. Cl. .............................. 353/31; 353/31; 353/33; 348/771

(58) Field of Search .............................. 353/20, 31, 33, 353/98, 99; 345/31; 348/742, 743, 771

(56) References Cited

U.S. PATENT DOCUMENTS

| 938,006 A | 9/1909 | Stephany et al. | 350/160 R |
| 3,905,684 A | 9/1975 | Cook | 350/173 |

(List continued on next page.)

FOREIGN PATENT DOCUMENTS

| DE | 24 58 663 | 6/1975 | G02B/27/14 |
| EP | 0 295 137 A1 | 12/1988 | H04N/9/31 |
| EP | 0 364 039 A1 | 4/1990 | H04N/9/31 |
| EP | 0 364 043 A1 | 4/1990 | H04N/9/31 |
| EP | 0 418 947 A1 | 3/1991 | H04N/9/31 |
| GB | 1 474 699 | 5/1977 | G02B/27/10 |
| GB | 2 286 895 | 8/1995 | G02B/27/10 |
| WO | WO 92/13424 | 8/1992 | H04N/9/31 |
| WO | WO 93/18620 | 9/1993 | H04N/9/31 |

Primary Examiner—Russell Adams
Assistant Examiner—Melissa J Koval
(74) Attorney, Agent, or Firm—Charles A. Brill; Wade James Brady, III; Frederick J. Telecky, Jr.

(57) ABSTRACT

A projection device includes one or more deformable mirror arrays (803) arranged to spatially modulate incident light. A totally internally reflecting surface (809) is arranged to direct light to and from the deformable mirror array (803). The device may include one or more dichroic layers (805) arranged such that the light incident on each dichroic layer (805) is substantially normal incidence to the layer.

11 Claims, 7 Drawing Sheets

U.S. PATENT DOCUMENTS

| | | | | |
|---|---|---|---|---|
| 4,035,836 | A | 7/1977 | Miyaji | 358/155 |
| 4,084,180 | A | 4/1978 | Stoffels | 358/55 |
| 4,857,997 | A | 8/1989 | Fukami et al. | 358/55 |
| 4,913,528 | A | 4/1990 | Hasegawa | 350/286 |
| 4,969,730 | A | 11/1990 | Van de Brandt | 353/31 |
| 5,130,826 | A | 7/1992 | Takanashi | 359/40 |
| 5,251,068 | A | 10/1993 | Oshima | 359/634 |
| 5,386,253 | A | 1/1995 | Fielding | 348/745 |
| 5,442,414 | A | 8/1995 | Janssen et al. | 353/98 |
| 5,552,922 | A | 9/1996 | Magarill | 359/224 |
| 5,594,591 | A | 1/1997 | Yamamoto | 349/5 |
| 5,604,624 | A | 2/1997 | Magarill | 359/224 |
| 5,658,060 | A | 8/1997 | Dove | 353/33 |
| 5,704,701 | A | 1/1998 | Kavanagh et al. | 353/33 |
| 5,743,612 | A | 4/1998 | Matsuda | 353/97 |
| 5,777,789 | A | 7/1998 | Chiu | 359/494 |
| 5,865,520 | A * | 2/1999 | Kavanaugh et al. | 353/31 |
| 6,172,809 | B1 * | 1/2001 | Koike et al. | 359/487 |
| 6,185,047 | B1 * | 2/2001 | Peterson et al. | 359/640 |
| 6,249,387 | B1 * | 6/2001 | Poradish et al. | 359/634 |
| 6,250,763 | B1 * | 6/2001 | Fielding et al. | 353/31 |
| 6,276,801 | B1 | 8/2001 | Fielding | 353/31 |
| 6,457,830 | B1 * | 10/2002 | Choi | 353/33 |
| 6,461,000 | B1 * | 10/2002 | Magarill | 353/81 |

\* cited by examiner

PROJECTION DEVICE COMPRISING A PRISM SYSTEM INCLUDING AT LEAST ONE TOTALLY INTERNALLY REFLECTING SURFACE AT A BOUNDARY BETWEEN TWO MEMBERS OF DIFFERENT REFRACTIVE INDICES WITHIN THE PRISM SYSTEM

This application is a continuation of U.S. application Ser. No. 08/930,084 filed with the U.S. Patent Office on Feb. 5, 1998, now U.S. Pat. No. 6,250,763.

This invention relates to a projection device. In particular, the invention relates to a projection device for use in a projection system in which a projected image is formed by spatially modulating light using one or more spatial light modulator devices, and then projecting the spatially modulated light on to a display.

A spatial light modulator is an optical component which is controllable to spatially modulate an incident light beam. One class of spatial light modulators are active matrix devices, which comprise a matrix of individually addressed light modulators each effective to modulate the part of a light beam corresponding to a pixel of the projected image.

Each light modulator may be a liquid crystal, for example as shown in EP 0401912.

Alternatively the active matrix device may comprise an array of the deflectable mirror devices commonly known as deformable mirror devices (DMDs) as, for example, described in U.S. Pat. No. 4,856,863, U.S. Pat. No. 4,615,595 and U.S. Pat. No. 4,596,992. Such deflectable mirror devices comprise an array of miniature mirrored cantilever beam elements which are electrostatically deflectable by electric fields provided across a corresponding array of electrodes. The extent of the deflection can be controlled by means of the electrostatic potential applied to the electrodes to provide variable degrees of deflection. Alternatively the mirror devices can be operated in a binary manner by applying predetermined electrostatic potentials to switch each mirror device between discrete deflection states. Grey scale is then displayed by causing each mirror device to deflect to an orientation in which light is directed either towards a display screen or towards a beam dump for periods corresponding to chosen multiples of a basic period.

Using an array of such mirror devices, each device being individually addressable, a two dimensional image can be produced. The small size and fast switching times of the mirror devices make them usable at video picture data rates, enabling the display of television or video moving images on the display screen.

In a projection system using a deflectable mirror device, the incident light beam does not scan, as in an electron beam in a cathode ray tube, but illuminates the whole array of mirror devices at once. Thus a projection system including one or more deformable mirror devices suffers the disadvantage that it is necessary to space the light source and the projection system from each other such that the light paths of light from the light source to the deflectable mirror or device, and the spatially modulated light transmitted by the deflectable mirror device to the projector system do not cross. This produces limitations on the compactness and efficiency of the overall system.

EP-A-0364043 and EP-A-0418947 both describe a projection system in which an assembly of two prisms between which is an air gap defining a totally internally reflecting surface is interposed in the light paths to and from a reflective liquid crystal spatial light modulator. The totally internally reflective surface is effective to transmit one of the light beams either passing to or from the spatial light modulator, and to reflect the other of the light beams thus separating the two beams.

Our copending International patent application WO 95/22868 (the contents of which are incorporated herein by reference) discloses a projection system including a prism assembly including at least one air gap defining a totally internally reflective surface effective both to deflect incident light onto a deflectable mirror array and to transmit spatially modulated light produced by the deflectable mirror array towards a projection lens system. Such an arrangement enables the light beams incident on and reflected off the spatial light modulator to overlap, thus enabling closer spacing of the light source and projector lens than would otherwise be possible.

According to a first aspect of the present invention there is provided a prism assembly for use in a projection system, the prism assembly including at least one totally internally reflective surface effective to transmit incident light onto at least one reflective spatial light modulator, and to reflect spatially modulated light produced by the spatial light modulator towards a display arrangement.

According to a second aspect of the present invention there is provided a projection device comprising at least one dichroic surface effective to split incident light into different colour component beams, and a plurality of reflective spatial light modulators, wherein the means for splitting the incident light into different colour component beams is incorporated in a prism assembly, said means for splitting light being arranged at an angle relative to the incident light dependent of the spread of angles of light within the incident light.

The spatial light modulators may be deflectable mirror devices. Alternatively the spatial light modulators may be reflective liquid crystal devices.

In one particular embodiment in accordance with the invention, there are provided an equal number of totally internally reflective surfaces to the number of spatial light modulators.

Alternatively a single totally internally reflective surface may be used to deflect light onto and deflect light from a plurality of spatial light modulators.

The totally internally reflective surface may be constituted by an air gap in the prism assembly.

A number of embodiments of the invention will now be described, by way of example only, with reference to the accompanying drawings in which.

Overall Operation of Projection System

Figure 1:
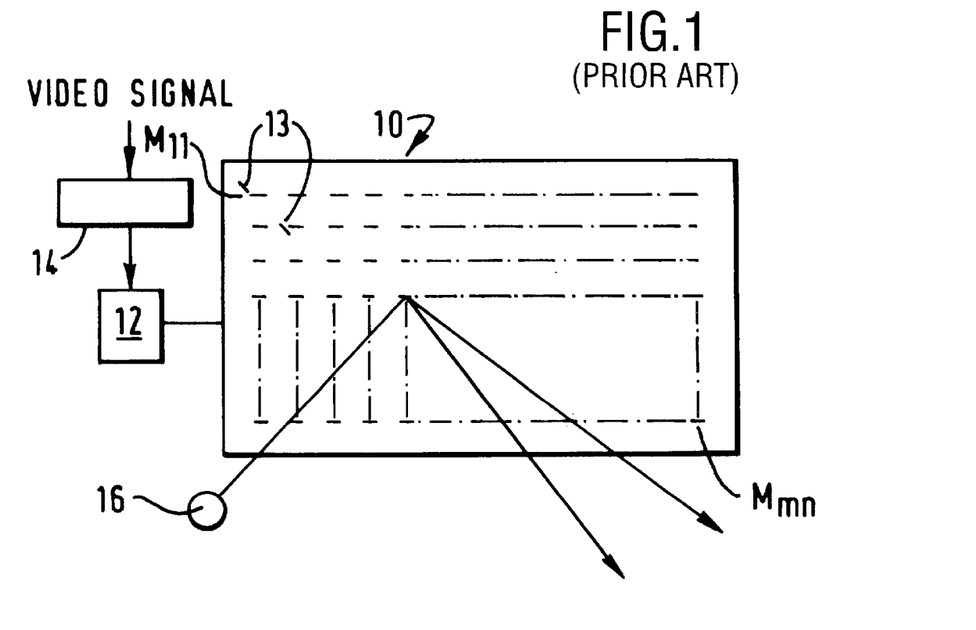
FIG. 1 shows schematically the functioning of a deformable mirror array.

Referring to FIG. 1, a deformable mirror device array for use in a projection device in accordance with the invention comprises an array 10 of m×n deflectable mirrors $M_{11}$–$M_{mn}$. Typically, there will be in the order of 500×500 mirrors for a low resolution display, and 2000×2000 mirrors for a high resolution display. The array 10 is connected to an electrical address circuit 12 which receives a signal from an input circuit indicated as 14 to which a colour video signal is input. The address circuit 12 addresses the electrodes (not shown) of each of the respective mirror devices $M_{11}$–$M_{mn}$, as described in our earlier International application number WO92/12506, (the contents of which are incorporated herein by reference).

Each mirror device is pivoted for rotational movement about a pair of hinges 13 at the diagonal corners of the mirrors as illustrated schematically in relation to mirror $M_{11}$.

Figure 2:
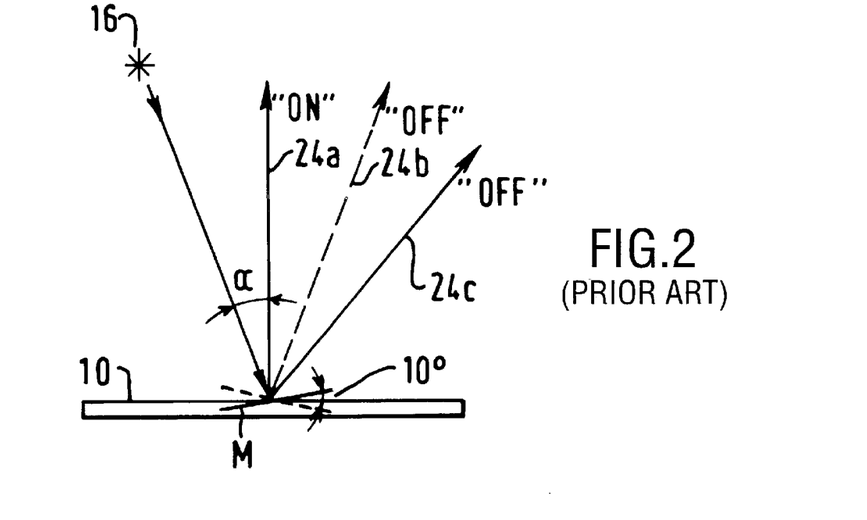
FIG. 2 shows schematically the optical illumination of a mirror within the array of FIG. 1.

Referring now also to FIG. 2, an incident light beam from a light source 16 is directed towards the array 10 at an angle $\alpha$ measured from the normal to the array of around 20°, the direction of the light beam being perpendicular to the pairs of hinges 13 of the mirror devices $M_{11}$ to $M_{mn}$. When an individual reflector device M is lying in its rest position, parallel to the plane of the array 10, the incident beam is reflected at a corresponding angle of 20° to the normal along path 24b in an "off" path leading to a beam dump (not shown in FIG. 2).

Figure 3:
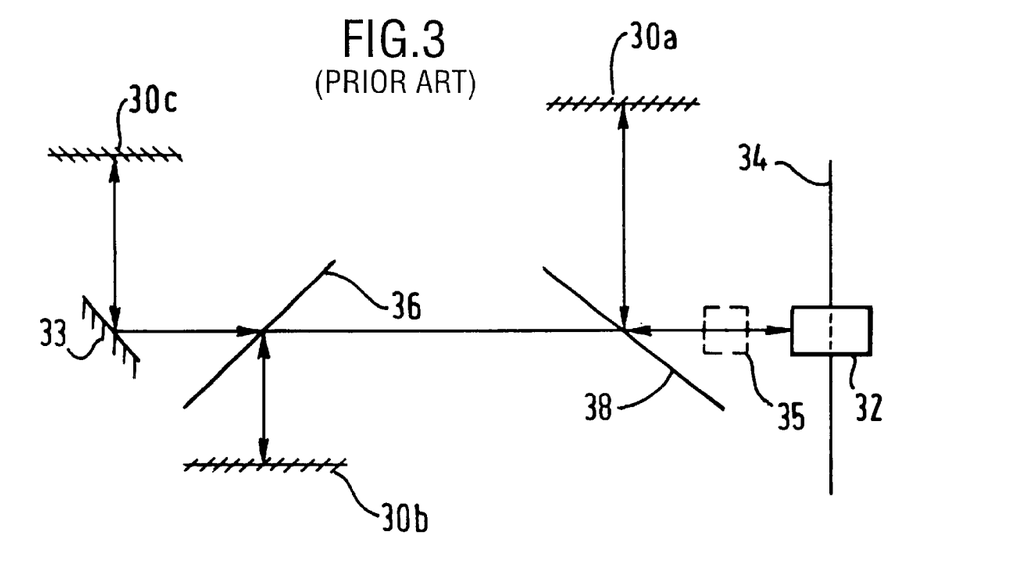
FIG. 3 is a plan schematic view of a colour optical projection display system incorporating the array of FIGS. 1 and 2.

When the control signal from the addressing circuit 12 sets the mirror device M into a first deflection state at an angle of 10° to the plane of the array 10, the incident beam is reflected out along the normal angle to the array on an "on" path 24a towards a projection lens and display screen (not shown in FIG. 2 but shown in FIG. 3 as 35 and 34). When the control signal sets the mirror device M into a second deflection state at the opposite angle of 10° to the first deflection state, the incident beam is reflected out at 40° to the normal along 24c in a second "off" path also leading to the beam dump.

Thus, when viewed along the "on" path 24a, at any instant, the array 10 displays a two dimensional image, those mirrors which have been set to the first deflection state appearing bright, and those which have been set to the second deflection state appearing dark.

In order to produce a full colour projection system, the deformable mirror array may be addressed in sequence by light within the blue, red and green wavelength bands, with the mirrors being addressed by appropriate control signals to produce sequential blue, red and green spatially modulated beams. Integration of each set of three differently coloured images projected on the display screen is performed by the eyes of an observers viewing the display screen.

Alternatively, referring now particularly to FIG. 3, a colour projection system may include three separate deformable mirror arrays 30a, 30b, 30c each of the general form described in relation to array 10 in FIGS. 1 and 2, arranged to spatially modulate light within respectively the blue, red and green wavelength bands in parallel. FIG. 3 illustrates the principle of operation of such a colour projection system.

A light source 32, which comprises a high power lamp such as an arc lamp, is arranged to generate white light along the incident light path to the three arrays 30a, 30b, 30c. The array 30c is arranged to deflect the incident beam such that the "on" path from the array 30c illuminates a projection screen 34 via the mirror 33 and a projection lens 35. The incident light path lies in a plane normal to that of the screen, for example by positioning the light source 32 above the display screen 34.

Positioned within the light path of the arrays 30a, 30b, 30c are a pair of splitter/combiner mirrors 36, 38 which are at an inclination, rotated about the vertical axis such as to reflect portions of the incident beam to the arrays 30a, 30b.

The splitter/combiner 38 nearest to the light source 32 carries a dichroic coating designed to reflect the blue light wavelength components of the incident beam towards the deformable mirror array 30a and to transmit the remaining red and green light substantially unattenuated. The array 30a is electrically addressed so as to spatially modulate the beam to correspond to the blue wavelength components of the picture to be displayed. The reflected "on" beam is deflected in the vertical plane by 20° relative to the beam incident on the array 30a, but is substantially horizontally unmodified.

The other splitter/combiner 36 carries a dichroic layer designed to reflect red wavelength components of the incident beam so as to direct the red light to a second deformable mirror device array 30b, which is electrically addressed so as to modulate the beam to correspond to the red wavelength components of the picture to be reproduced, the reflected "on" path being defected 20° in the vertical plane relative to the direction of the incident beam on the array 30b.

The remaining green wavelength component light is transmitted substantially unattenuated by the splitter/combiner 36, and is reflected off the mirror 33 so as to be incident on a third deformable mirror device array 30c. The array 30c is electrically addressed so as to spatially modulate the beam with the green wavelength components of the picture to be reproduced, the reflected "on" path again being deflected 20° in the vertical plane relative to the direction of the incident beam on the array 30c.

The spatially modulated green light then passes substantially unattenuated back through both splitter/combiners 36, 38 through the projection lens 35 to be projected onto the screen 34. At the first splitter/combiner 36 reached on the return path, the spatially modulated beam from the red array 30b is reflected by the splitter/combiner 36 into the same path as the spatially modulated green beam. At the second splitter/combiner 38 reached in the return path the spatially modulated beam from the blue array 30a is reflected by the splitter/combiner 38 back into the same path as the spatially modulated green and red light beams so that the light at the projection lens 35 comprises the recombined spatially modulated light beams. The reflection of the spatially modulated green beam by the mirror 33 causes the beam to have the same "handedness" as the red and blue spatially modulated beams produced by the blue and red arrays 30a, 30c which have been reflected by the splitter/combiners 36, 38.

The arrays 30a, 30b, 30c are positioned such that the optical path traversed from each array 30a–30c to the screen 34 is the same.

First Embodiment

The systems as so far described suffer the disadvantage that the optical components must be widely spaced in order to prevent overlapping of the input and output beams to each spatial light modulator array 30a,b,c in FIG. 3. This puts a limit on the compactness of the system which can be achieved. This problem can be at least alleviated by the use of a total internally reflecting surface, as produced at an interface between two materials of different refractive indices, for example at a transition between air and glass. This is used to direct light to and from a deformable mirror array, separating the beams passing to and from the mirrors of the array.

Figure 4:
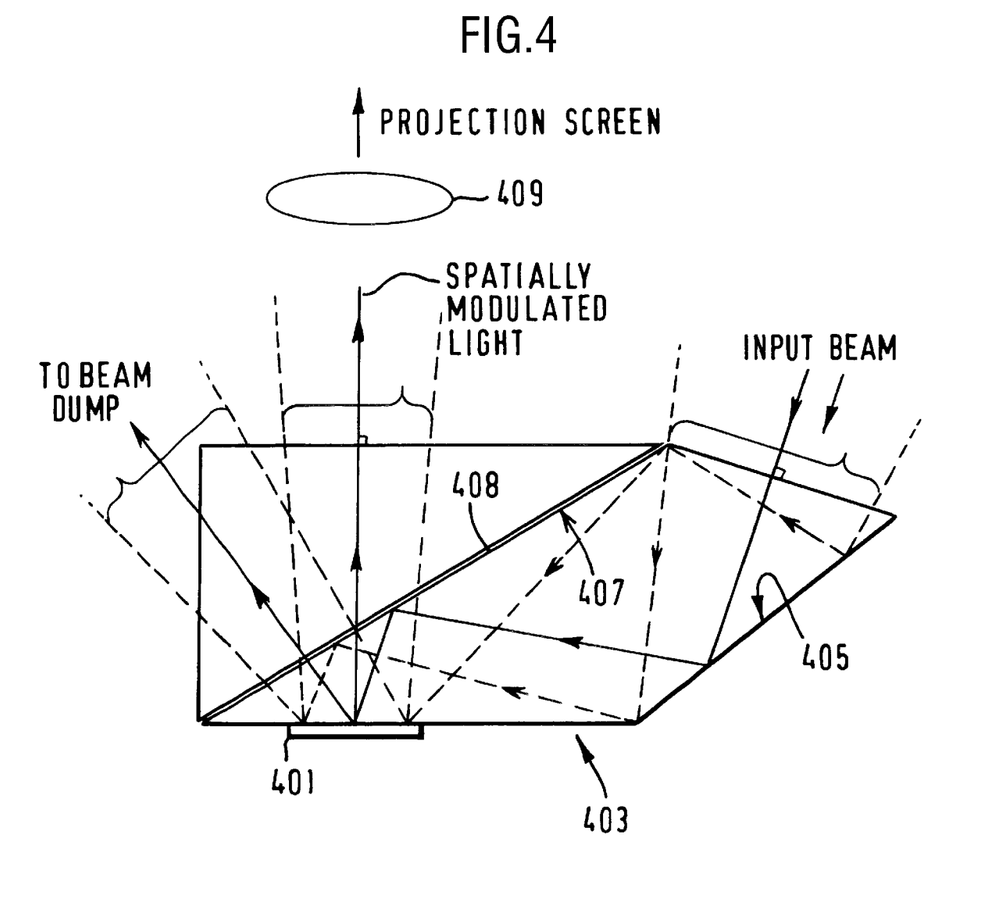
FIG. 4 illustrates the use of a totally internally reflective surface in a projection device.

An example of a projection device incorporating such a total internally reflecting surface is shown in FIG. 4. The device is incorporated in either a monochrome projection system or a system incorporating a colour wheel in which light of different colour components is projected sequentially onto a single spatial light modulator in the form of a deflectable mirror array 401.

An input beam from a light source (not shown in FIG. 4) is directed to the deformable mirror array 401 through a prism assembly 403. A mirrored prism face 405 within the prism assembly is effective to direct the incident light onto a totally internally reflecting surface 407 defined by the interface between an air gap 408 within the prism assembly 403 and the adjacent prism surface. The totally internally reflecting surface 407 is effective to reflect the incident light onto the deflectable mirror array 401 at an angle of 20° to the normal as described in relation to FIGS. 1 and 2.

Spatially modulated light reflected from the deformable mirror array 401 along the "on" path 24*a* defined in FIG. 2 is directed towards a projection lens indicated schematically as 409, for projection onto the projection screen (not shown in FIG. 4). Light along the "off" path 24*b* in FIG. 2, is reflected at the corresponding 20 degree angle to the normal to a beam dump (not shown) in FIG. 4.

It will be seen that the incorporation of the total internally reflective surface 407 enables separation of the incoming and spatially modulated beams in the prism assembly in a shorter distance than would otherwise be possible. A larger aperture system is therefore practicable than would otherwise be possible.

Figure 5:
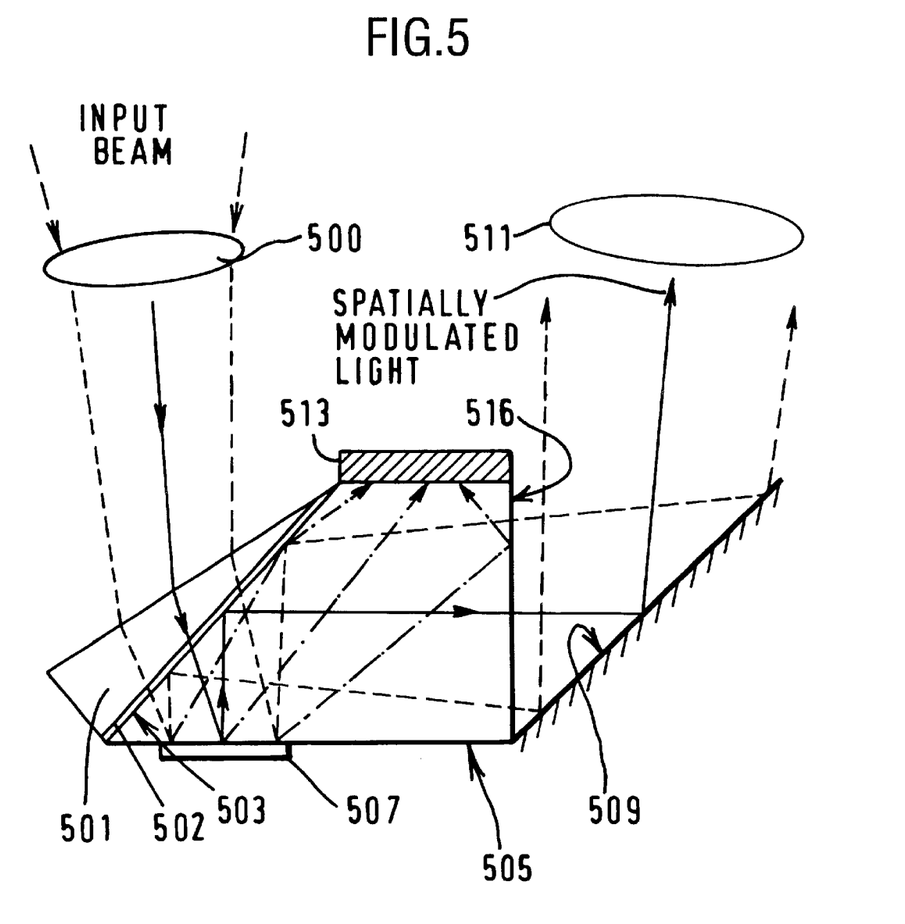
FIG. 5 illustrates a modification of the projection device of FIG. 4.

A disadvantage of the device shown in FIG. 4 is that the air gap 408 will produce astigmatism in the spatially modulated light passing through the air gap 408. FIG. 5 illustrates an embodiment of the invention in which this problem is overcome. In the embodiment of the invention shown in FIG. 5, the incoming light from the light source (not shown in FIG. 5) is focused by a condenser lens 500 onto a steering prism 501 at an angle so as to pass through an air gap 502 defining total internal reflective surface 503 within a prism assembly 505. This light passes onto a deflectable mirror array 507. Spatially modulated light reflected from the deformable mirror array 507 along the "on" path 24*a* of FIG. 2 is reflected back onto the totally internally reflective surface 503 where it is totally internally reflected within the prism assembly onto a mirrored surface 509. The spatially modulated light is then directed towards a projection lens 511 for projection onto the display screen (not shown in FIG. 5).

Light along the "off" path 24*b* shown in FIG. 2, is also totally internally reflected at the total internal reflection surface 503, but at an angle such that it passes into a beam dump 513 at the edge of the prism assembly 505 either directly or via the totally internal reflective surface 516 at the output surface of the prism assembly.

The beam dump 513 may take several forms. It may take the form of a layer of black glass or other absorber which is bonded or fused to the prism assembly 505. At the surface of the beam dump, remote from the prism assembly 505, there may be attached a copper heat sink or other cooling means (not shown). The heat sink may project out so as to mount onto additional external heat sink components (not shown).

The prism assembly 505 may be made of any convenient optical glass, for example BK7 optical crown glass. If the beam dump 513 is formed from black glass layer 513, this will have a refractive index matched to that of the prism assembly 505. Thus for example the black glass layer may be type NG1 available from Schott. The thickness of the black glass layer 513 will be chosen to be a compromise between the requirement for light absorption, and requirement for the heat generated to be conducted away from the prism assembly 505, and will typically be of 0.5 millimeters thickness.

It will be seen that the system illustrated in FIG. 5 has the advantage over the system illustrated in FIG. 4 that the spatially modulated light along the "on" path from the deflectable mirror device 507 does not pass through the air gap 503, but undergoes total internal reflection within the prism assembly 505. Thus any astigmatism in the spatially modulated beam produced by the air gap 407 illustrated in FIG. 4 is avoided.

It will be appreciated that some of the light directed along the "off" path 24*b* will not be directed onto the totally internally reflective surface 503 but will be directed towards the output face of the prism assembly 505. This light will be reflected by the output surface 516 onto the beam dump 513.

The array 507 may optionally be cemented onto the appropriate facet of the prism assembly 505 using a suitable cement, or may be coupled using optical coupling fluid. Alternatively the array 507 may be movable relative to the facts, in order to allow alignment of the array.

The air gaps 503 formed in the prism assembly 505 will typically be around 15 microns thick. The air gap may be defined by means of recesses in the glass of the prism assembly. Alternatively spacers, for example mica or loops of fine metal wire, may be used to produce air gaps of very accurate spacing. The spacers will be attached to the prism assembly 505 using some form of cement, the choice of which will be obvious to a person skilled in the art of projection systems. The spacers will be thermally matched to the glass of the prism assembly 505.

The light from the lamp 16 may contain substantial power in the infra red and ultra violet frequency bands. The infra red radiation is undesirable because it heats the optical components leading to potential misalignment of the optical components. The ultra violet radiation is undesirable as it may affect the cement which holds the prism components together. Thus the front convex surface of the condenser lens 500 which is used to focus light from the light source onto the prism assembly 505 may be coated with a coating 513 which transmits visible light but reflects infra red and/or ultra violet radiation. The surface through which the light beam enters the prism assembly 505 may also advantageously be coated with a filter coating 515 to reduce further the level of infra red and/or ultra violet unwanted radiation. Either of these coatings may also be designed to trim the spectral distribution of the light from the light source which passes into the system.

Second Embodiment

Figure 6:
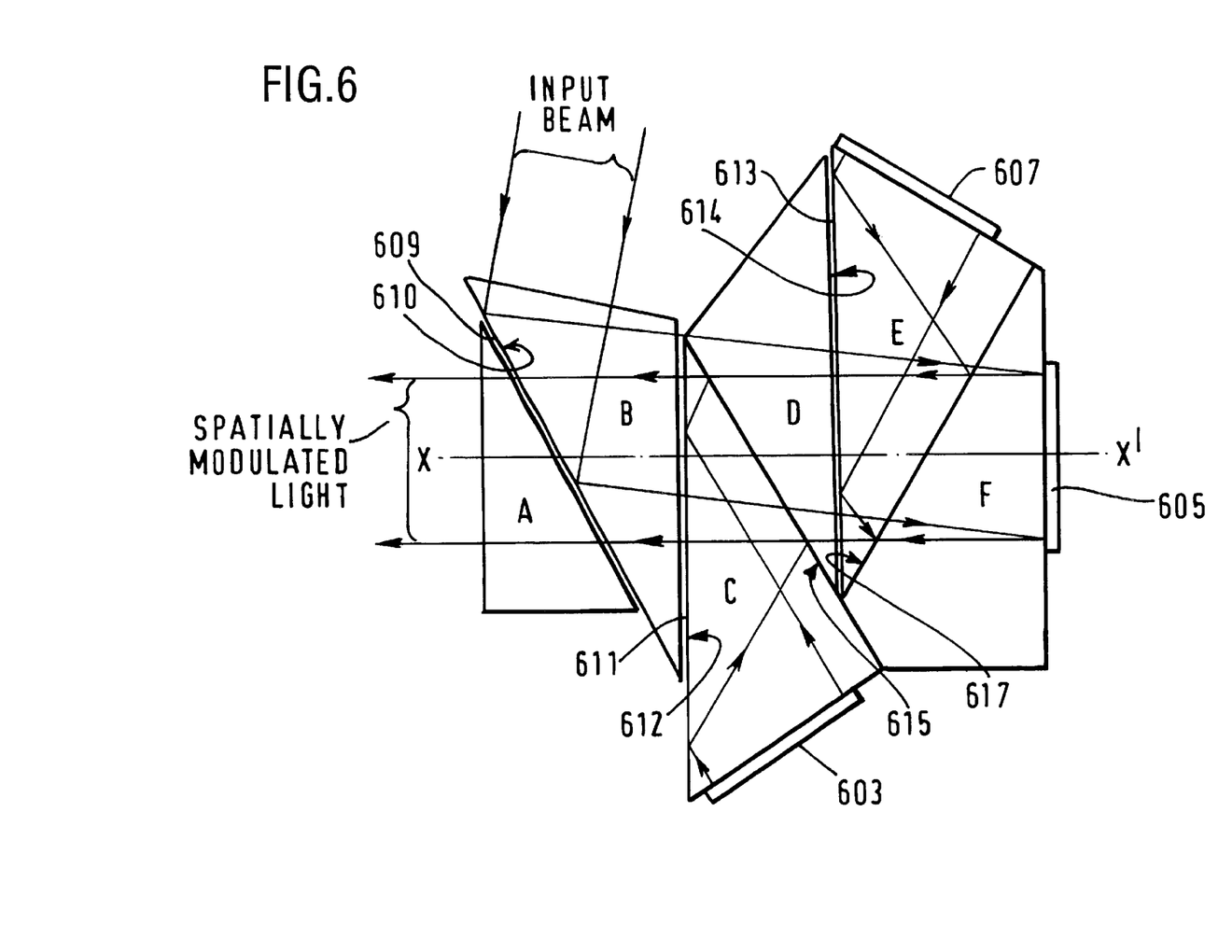
FIG. 6 illustrates schematically a further embodiment of a projection device in accordance with an embodiment of the invention.

Turning now to FIG. 6, the second embodiment of the invention to be described is incorporated in a colour projection system in which three separate deflectable mirror arrays are arranged to spatially modulate respectively red, blue and green light.

A prism assembly formed of six prisms A, B, C, D, E and F carries three separate deflectable mirror arrays 603, 605, 607 each being separately addressable so as to be responsive to spatially modulated incident blue, green and red light respectively. On the prism surface between prisms C and D, there is formed a first dichroic layer 615 effective to reflect blue light and transmit red and green light. On the prism surface between prisms E and F there is formed a second dichroic layer 617 effective to reflect red light and transmit light of other wavelengths.

Between prisms A and B, B and C, and D and E there are formed three air gaps 609, 611 and 613, these defining totally internally reflective surfaces 610, 612 and 614 respectively for light incident on these surfaces at greater than a critical angle.

It will be appreciated that the arrangement shown in FIG. 6 is in fact a three dimensional prism array, the prisms indicated as A and B being set at an angle of 45° about the axis X, X' so as to be normal to the hinge axes of the mirror elements within each of the blue and red DMD arrays 603, 607. The schematic form of the illustration in FIG. 6 is for the sake of clarity, the light splitting paths for the red and blue light being omitted.

Incident light from a white light source (not shown) is reflected from the totally internally reflective surface 610 between the first two prisms A and B. The green light wavelength components pass through prism C, dichroic layer 615, prism D, prism E, dichroic layer 617 and prism F in turn, to be incident on the green deflectable mirror array 605 at the appropriate angle indicated in FIG. 2. Spatially modulated green light along the "on" path reflected from the mirror array 605 then passes through the prisms F, E, D, C, B and A and through all three air gaps 609, 611, 615 to the projection lens (not shown in FIG. 6). The dichroic layer 615 between prisms C and D reflects the blue light onto the blue deflectable mirror array 603, whilst the red light is reflected by the dichroic layer 617 between prisms E and F onto the red deflectable mirror array.

Light from the red deflectable mirror device is totally internally reflected by the third totally internally reflective surface 614 and then reflected off the dichroic layer 613 to be recombined in the output light path to the projection lens (not shown in FIG. 6). Light from the blue deflectable mirror array 603 is totally internally reflected by the second totally internally reflective surface 612 formed between the prisms B and C and reflected by the second dichroic layer 617 to be recombined with the spatially modulated red and green output beams to form a white output beam exiting towards the projection lens (not shown in FIG. 6).

It will be appreciated that as the red and blue spatially modulated light undergoes two reflections prior to being recombined to form the output white spatially modulated light beam, it is not necessary to provide a further reflector in the green light path as shown in FIG. 3 to produce the same "handedness" for light within each colour channel. It will be appreciated that the prism arrangement shown in FIG. 6 provides a particularly compact configuration.

Third Embodiment

Figure 7:
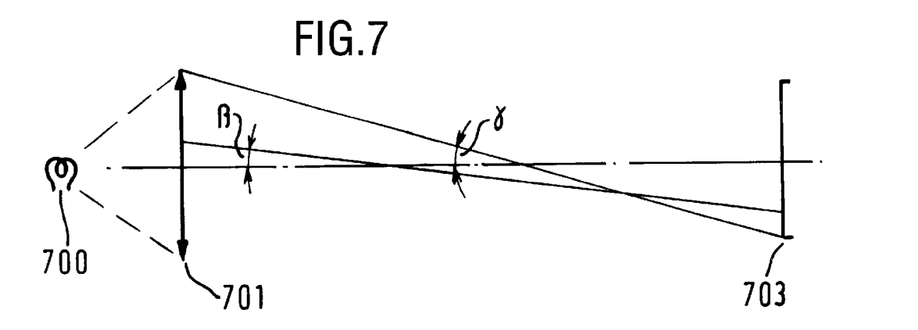
FIG. 7 is an explanatory drawing illustrating schematically an incident beam on a projection device.

It will be appreciated that the light emitted by the light source 16 illustrated in FIGS. 1 and 2 will not be a point light source, but will typically be an arc lamp producing an approximately parallel beam which is in turn focused by a condensing lens onto the deflectable mirror arrays. Thus as illustrated in FIG. 7, there will be a range of values of the angle β at which the light from the light source 700 is incident on any of the optical components such as the component 703 up to a maximum value γ which will depend on the design of the input optics, including the path length between the condensing lens 701 and the component 703.

In the case where the component 703 is a dichroic splitting mirrors as illustrated for example as 34 and 36 in FIG. 3, the light may be incident on the dichroic mirrors at an angle which is sufficiently far from the normal to the dichroic mirrors that polarization effects cause a broadening of the shape of the transmission/reflection spectra, making sharp precise colour splitting by the dichroic surfaces difficult to achieve, and thus limiting both the efficiency and the colorimetry of the system. If the angle of incident of the light on the dichroic surface is reduced towards normal incidence so as to reduce these polarization effects, the size of the light splitting system will increase forcing the use of longer, less light efficient, optical paths. As a compromise, an angle of incidence on the dichroic surfaces of approximately 30° from the normal may be used, as used, for example in our copending International application WO 95/22868.

Figure 8:
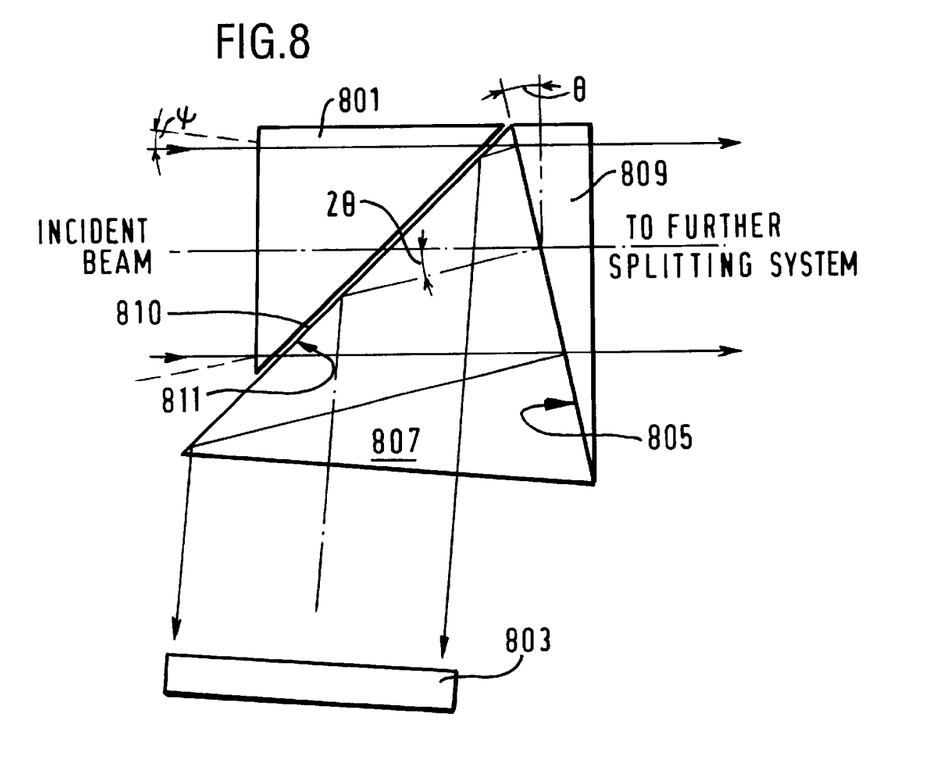
FIG. 8 illustrates a further embodiment of part of a projection device in accordance with an embodiment of the invention.

Turning now to FIG. 8, this figure is a schematic illustration of a colour splitting system for splitting a multi-component light beam incident on an input prism 801 into light of a particular wavelength band, which is then directed onto a spatial light modulator indicated schematically as 803. For clarity the return path from the spatial light modulator has been omitted. A dichroic layer 805 is formed in the interface between two further prisms 807 and 809 forming part of the prism assembly. The dichroic layer 805 is effective to selectively reflect light within a particular wavelength band, for example red light, and reflect the red light towards a totally internally reflective surface 811 defined at one surface of an air gap 810 between the input prism 801 and the second prism 807. The red light is totally internally reflected from the surface 811 and directed onto the deformable mirror array 803. Light within other wavelength bands passes through the dichroic surface 805 through the output prism 809 to, for example a further splitting system (not shown in FIG. 8).

The inventors have found that if the incident path is analyzed, there is a definite limited range of ray angles that can be used. The dichroic surface 805 is arranged so as to be set at an angle θ to the normal to the incident beam which is slightly greater than the greatest angle ψ subtended by the input beam to the optical axis. A typical value for θ is about 7°. The dichroic surface will then be effective to reflect the selected wavelength band light at an angle of 2 θ to the optical axis.

Figure 9:
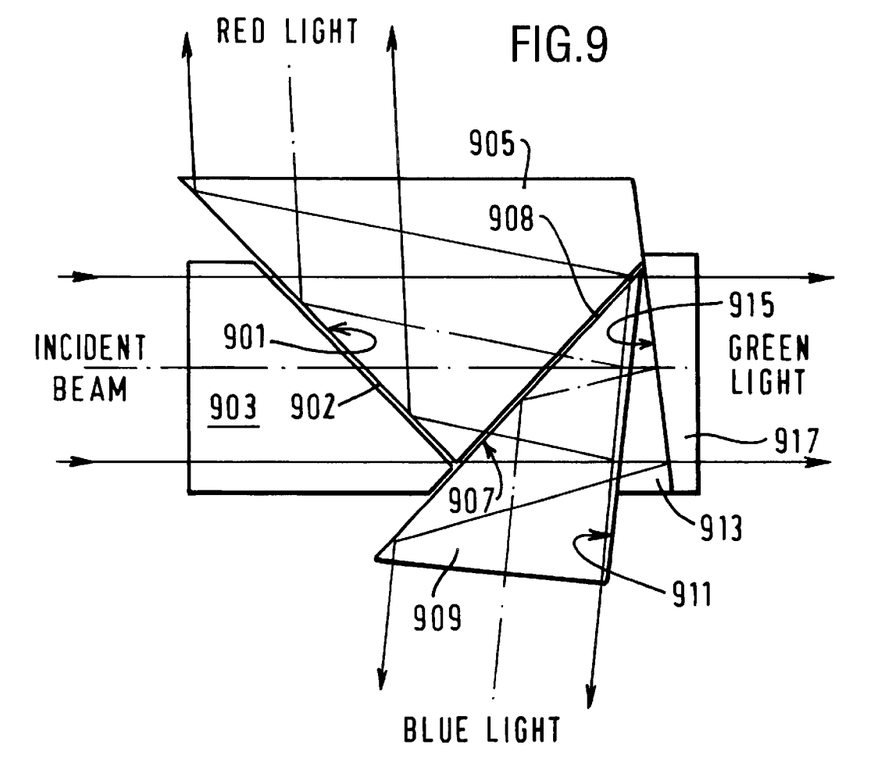
FIG. 9 illustrates a further embodiment of a splitting stage incorporated in a device in accordance with an embodiment of the invention.

Turning now to FIG. 9, in an adaptation of the arrangement illustrated in FIG. 8, a second splitter stage may be incorporated to enable incident while light to be split into red, blue and green colour channels. A first totally internally reflecting surface 901 is defined at one surface of an air gap 902 between an input prism 903 and a first output prism 905. A second totally internally reflecting surface 907 is defined at one surface of an air gap 908 between a second output prism 909 and the first output prism 905.

A first dichroic layer 911 effective to selectively reflect red light and to transmit light within all other wavelength bands is formed between the second output block 909 and an intermediate block 913. A second dichroic layer 915 effective to selectively reflect blue light and transmit light within all other wavelength bands is formed between the intermediate block 913 and a third output block 917.

Thus in use of the splitter shown in FIG. 9, input white light is directed into the input block 903, passing straight through the first totally internally reflective surface 901. The light is incident on the dichroic layer 908 at a small angle to the normal to the dichroic layer. Red light is reflected from the first dichroic layer 911 to be reflected back onto the first air gap 901 and totally internally reflected through the output prism 905. The red light then passes to the first spatial light modulator (now shown) which is arranged to spatially modulate red light.

Light of wavelengths other than red light passes through the first dichroic layer 911 onto the second dichroic layer 915, also at a small angle to the normal to the dichroic layer. Blue light within the remaining light is reflected by the second dichroic layer 915 onto the second air gap 907 to be totally internally reflected by the surface 907 to pass to the second spatial light modulator (not shown) which is addressed so as to spatially light modulate the blue light.

The remaining green light passes through the second dichroic layer 915, to pass through the output prism 917 to the third spatial light modulator (not shown) which is arranged to spatially modulate the green light.

It will be seen that due to the particular optical configuration, the green light passes directly to the green deflectable mirror device, whilst the red and blue light both undergo a double reflection. Due to this double reflection compared to the configuration shown in FIG. 3, as in the configuration illustrated in FIG. 6 there is no necessity to provide a reflective surface for the green light such that the three light component beams have the same handedness as discussed in relation to FIG. 3.

It will be appreciated that the configurations shown in FIGS. 8 and 9 may be adjusted to perform particular configurations dictated by the system design. Extra stages can be incorporated in order to eliminate infra-red or ultra-violet light within the input light beam. It will be appreciated however that due to the almost normal incidence of the input beam on each of the dichroic surfaces, very small polarization losses will occur. In particular, it will be appreciated that whilst the blue light has to undergo a double transition through the first dichroic layer 911, due to the near normal incidence of the light on the dichroic surface losses will be minimized. Alternatively, any losses can be used to fine tune the colorimetry of the system by fine tuning the colour spectrum within the three colour channels. The nested configuration shown in FIG. 9 enables a very compact splitting system to be achieved which can be made to be very efficient.

It will also be appreciated that the spatial light modulators may be set at nearly 90° to the input beam. It will also be appreciated that due to the high efficiency of the system, a further stage may be incorporated to separate out the third colour component light beam, i.e. green light in the example shown in FIG. 9, thus allowing unwanted infra-red or ultra-violet radiation to pass on and out of the system.

It will be appreciated that in a high power system, the internal reflective surface incorporated in any of the embodiments of the invention can be produced without an air gap by utilizing the difference in refractive index between the two prisms components defining the surface. Thus one of the prism may be sapphire, whilst the other prism may be a silica or other low index glass prism. Whilst this does alter the path alignments of the beams, a stronger assembly is achieved. A further possibility is that in, for example FIG. 9 the output prism 905 may be formed of, for example sapphire and emersed in a fluid such as silicon oil or water to provide the internal reflective surfaces 901, 907. Such an arrangement would be extremely robust in optical terms and enable the handling of very high power levels.

It will be appreciated that whilst the projection systems shown in FIGS. 6, 8 and 9 use the colour splitting scheme shown schematically in FIG. 3, other colour splitting schemes may be used in a system in accordance with the invention, for example a scheme using the three colours magenta, cyan and yellow, or using more than three colour component beams. The system in accordance with the invention may also use the colour splitting mirrors to improve the balance of light modulated by the spatial light modulators.

In some applications it may be advantageous to add a further array to the three arrays used in a colour projection system. Such a further array may be for example used for power handling reasons as for example disclosed in the applicant's co-pending PCT application no. WO 95/04582, the contents of which are incorporated herein by reference. Thus, for example it may be advantageous to arrange for the green colour channel to be split between two arrays.

It will also be appreciated that a single air gap may be used to divert the unwanted light where an air gap is not used to direct light onto the spatial light modulators.

It will also be appreciated that whilst the spatial light modulators array described by way of example are deflectable mirror devices, a projection system in accordance with the invention also finds application where other reflective spatial light modulators such as reflective liquid crystal devices are used. It will also be appreciated that the splitting system illustrated in FIGS. 8 and 9 will also find application with a transmissive spatial light modulator, for example a liquid crystal device.

What is claimed is:

1. A projection device comprising a light source, at least one deflectable mirror array effective to spatially modulate light from the light source and a prism system arranged in the light path between the light source and the deflectable mirror array, the prism system including at least one totally internally reflecting surface for light incident on the surface at greater than a critical angle, the surface being effective to transmit light incident on the surface at less than said critical angle, the surface being at a boundary between two members of different refractive indices within the prism system, the totally internally reflective surface being arranged to transmit light from the light source to the deflectable mirror array, and to reflect spatially modulated light from the deflectable mirror array such that no spatially modulated light traverses the boundary.

2. A projection device according to claim 1. in which the at least one of the totally internally reflective surfaces comprises a boundary between a solid material and a fluid.

3. A projection device comprising a light source, at least one spatial light modulator effective to spatially modulate light from the light source and a prism system arranged in the light path between the light source and the spatial light modulator, the prism system including at least one totally internally reflecting surface for light incident on the surface at greater than a critical angle, the surface being effective to transmit light incident on the surface at less than said critical angle, the surface being at a boundary between two members of different refractive indices within the prism system, the totally internally reflective surface being arranged to transmit light from the light source to the spatial light modulator, and to reflect spatially modulated light from the spatial light modulator such that no spatially modulated light traverses the boundary.

4. A projection device according to claim 3. in which the at least one of the totally internally reflective surfaces comprises a boundary between a solid material and a fluid.

5. A projection device according to claim 3. in which the spatial light modulator is a liquid crystal device.

6. A projection device according to claim 3. in which the spatial light modulator is a deflectable mirror array.

7. A projection device according to claim 2. or 4. in which said fluid is silicone oil.

8. A projection device according to claim 2. or 4. in which the fluid is water.

9. A projection device according to claim 2. or 4 in which the fluid is air.

10. A projection device according to claim 1. or 3. including means for removing unwanted wavelengths within the incident light from the spatially modulated beam.

11. A projection system including a projection device according to claim 1. or claim 3. and a display screen.

* * * * *